United States Patent [19]

Fisch et al.

[11] 4,426,437

[45] Jan. 17, 1984

[54] IMAGEABLE MATERIAL WITH RADIATION ABSORBING MICROSTRUCTURED LAYERS OVERCOATED WITH PHOTORESIST LAYER

[75] Inventors: Richard S. Fisch, St. Paul; Valdis Mikelsons, Mendota Heights, both of Minn.

[73] Assignee: Minnesota Mining and Manufacturing Company, St. Paul, Minn.

[21] Appl. No.: 278,978

[22] Filed: Jun. 29, 1981

[51] Int. Cl.³ .......................... G03C 1/96; G03C 1/94
[52] U.S. Cl. .................................... 430/166; 430/275; 430/276; 430/277; 430/278; 430/158; 430/321; 430/271; 346/135.1
[58] Field of Search ............... 430/275, 278, 277, 166, 430/158, 346, 276, 321, 271; 346/135.1

[56] References Cited

U.S. PATENT DOCUMENTS

| | | | |
|---|---|---|---|
| 3,811,894 | 5/1974 | Yonezawa et al. | 430/278 |
| 3,975,197 | 8/1976 | Mikelsons | 430/278 |
| 4,008,084 | 2/1977 | Ikeda et al. | 430/276 |
| 4,021,592 | 5/1977 | Fromson | 430/278 |
| 4,115,123 | 9/1978 | Okai et al. | 430/275 |
| 4,138,262 | 2/1979 | Wacks et al. | 430/276 |
| 4,173,078 | 1/1979 | Izu et al. | 430/346 |
| 4,199,615 | 4/1980 | Wacks et al. | 430/346 |
| 4,216,246 | 8/1980 | Iwasaki et al. | 430/275 |
| 4,217,596 | 8/1980 | Jung | 346/135.1 |
| 4,245,229 | 1/1981 | Stephens | 346/135.1 |
| 4,252,843 | 2/1981 | Dorer et al. | 427/162 |
| 4,387,156 | 6/1983 | Crawford et al. | 430/278 |

OTHER PUBLICATIONS

Flood, P. R., "Thin Film Thickness Measurements".
Kovacs et al., "Formulation . . . Polymer Surface", EMSA Conference Proceedings.
Maa, J. S., et al., "Direct Observation . . . Mico", Eng. & Mat'l. Science Assn. Meeting.

Primary Examiner—Charles L. Bowers, Jr.
Attorney, Agent, or Firm—Donald M. Sell; James A. Smith; Mark A. Litman

[57] ABSTRACT

An imageable article comprising a photoresist layer on a substantially radiation absorbing layer of metal having a microstructured surface characterized by a plurality of randomly positioned discrete protuberances of varying heights and shapes, which protuberances have a height of not less than 20 nanometers nor more than 1500 nanometers, and the bases of which contact the bases of substantially all adjacent protuberances is disclosed. The imageable article is particularly useful in the field of graphic arts.

13 Claims, 2 Drawing Figures

IMAGEABLE MATERIAL WITH RADIATION ABSORBING MICROSTRUCTURED LAYERS OVERCOATED WITH PHOTORESIST LAYER

TECHNICAL FIELD

The present invention relates to imaging systems and in particular to imaging systems useful in graphic arts. These systems comprise radiation absorbing surfaces with photoresist layers over them.

BACKGROUND OF THE ART

Many imageable materials and imaging technologies are commercially available today. The most useful of these technologies tend to have photosensitive capabilities which enable convenient reproduction of images. This is particularly true in the micrographics and graphic arts field.

The most commonly used imaging systems are based on silver halide emulsion technology, diazonium salt technology, or photopolymerizable composition technology. Each of these different systems has its own advantages and problems.

Silver halide films are the most widely used graphic arts materials. These films show high resolution, high imaging speeds, and consistency in their performance. However, because of the rising cost of silver, systems using silver halide emulsions are becoming economically disadvantageous. Silver halide films also have other disadvantages including the requirement for multiple steps in processing, unstable processing solutions, and lack of dimensional stability.

Imaging systems using diazonium salt compositions provide high resolution and are considerably less expensive than silver to produce. The visible image produced by most diazonium salt systems consists of a dye and tends to have limits on the maximum optical densities or image color obtainable, higher minimum densities than desirable, and often suffers from a low contrast. Although thermally developable diazonium salt systems are available in the marketplace, many diazonium salt image systems still rely upon ammonia development which is undesirable because of the difficulty of working in a closed environment with ammonia. Often the diazo image comprises a dye and is not considered archival in the micrographic context.

Photopolymeric imaging systems are both inexpensive and easy to make. However, these systems usually depend upon the loading of the photopolymeric layer with opacifying material to provide optical density, which tends to reduce the sensitivity of the photosensitive layer.

One type of system which has recently been introduced to the art comprises a substrate having on at least one surface thereof a roughened metallic layer which is overcoated with a metal or metal alloy layer and subsequently coated with a photosensitive resist composition. This type of technology is exemplified by U.S. Pat. No. 4,138,262 wherein a bismuth layer is sputter deposited upon a substrate and a continuous high optical density layer of bismuth or an alloy of bismuth is vacuum deposited on the sputtered metal layer to provide a highly opaque appearance to the surface. This system is developed in two steps by first imagewise exposing the photoresist layer, then dissolving away the photoresist material in an imagewise manner to expose the underlayers of metal. The exposed metal or metal alloy is etched away in a second step. When viewed from the photoresist side, this provides a black metal image on a clear background. When viewed from the opposite side, this provides a shiny metal layer on a clear background. This system requires two separate metal coating steps and requires two developing solutions, one for the photoresist and the other for the metal or metal alloy opaque layer. The system as disclosed is also limited in the metals that can be used. Other systems which utilize photoresist layers over metal or metallized substrates are disclosed in U.K. Pat. No. 1,468,746 wherein substrates of metal are overcoated with photoresist materials. The film is shown to be particularly desirable for microforming images and shown to have outstanding edge acutance and high resolution. The system will only provide images having substantially pure metal features.

U.S. Pat. Nos. 4,008,084 and 4,158,079 show imaging systems using combinations of metals in different layers or different layers of metals and metal oxides under photoresist compositions. The latter patent in particular shows an imaging system comprising a substrate having respectively on at least one surface an aluminum foil layer, an aluminum oxide layer and a photoresist composition. This material suffers from poor bonding of the aluminum oxide layer to the photopolymer layer which causes separation of those layers during development, particularly by aqueous alkaline developers conventionally used with photoresist materials. The juncture between the metal/metal oxide layer has a sharp, discontinuous transition from metal to metal oxide because of the manner in which it is formed.

U.S. Pat. No. 4,158,079 discloses another imageable composite comprising a substrate, an aluminum foil layer, an aluminum oxide layer and a photoresist layer. The aluminum foil layer is adhered to the substrate by an adhesive and the aluminum oxide layer is produced by anodization of the foil. The optical density of the composite is increased by adding coloring material to the aluminum oxide layer prior to applying the photoresist. This composite has the disadvantage of requiring multiple steps in manufacturing of the substrate (both lamination and anodization) and in the fact that addition of a coloring material to the aluminum oxide layer fills the pores of that layer and reduces the ability of the photoresist layer to bond to that surface.

U.S. patent application Ser. No. 231,031, filed Feb. 4, 1981 in the name of G. H. Crawford and R. S. Fisch entitled "Imageable Film" discloses the use of a mixed phase of metal and metal oxide or sulfide as a substrate under photoresist films. Each of these technologies has utility in the art, but less expensive and more consistent systems are always desirable.

The substrate used in the practice of the present invention is the radiation absorbing surface of U.S. patent application Ser. No. 278,979, filed the same day as this application in the names of V. Mikelsons, G. Dorer, and R. D. Kuehn.

DISCLOSURE OF INVENTION

The present invention provides an imageable film comprising a photoresist layer on a substantially radiation absorbing layer of metal having a microstructured surface characterized by a plurality of randomly positioned discrete protuberances of varying heights and shapes, which protuberances have a height (preferably average height) of not less than 20 nanometers nor more than the wavelength of the radiation absorbed, i.e., 1,500 nanometers, preferably less than 800 nm, most preferably less than 600 nm, and the bases of which contact the bases of substantially all adjacent protuberances, providing little, if any, flat surface. The tips or apices of the protuberances are generally spaced apart by a distance in the range of 3 to 500 nm. The average spacing between the tips can be no more than twice the average height of the protuberances, and preferably it is no more than half the average height. The most preferred average spacing between the tips is in the range of 1/10 to ¼ the average height of the protuberances.

In the preferred embodiment, the articles of the present invention comprise a substrate, a microstructured metal oxide layer, and an overcoating of a thin film of at least one metal. In a second embodiment, the article has a microstructured replicated composite surface of a material such as plastic, overcoated by a thin-film of at least one metal. In a third embodiment, the article is a replicated microstructured surface of metal. In the preferred embodiment, the articles of the present invention comprise a substrate which may be of virtually any construction, i.e., transparent or opaque, insulative, semiconductive or metallic, having a flat, curved or complex shape, and having formed thereon a non-absorbing metal oxide (including oxide-hydroxide mixtures) coating, the metal being selected from the group consisting of aluminum, magnesium, zinc, or alloys thereof. The oxide layer can be formed by the substantially complete conversion of a thin-film of a metal or metal alloy, the thickness of which thin-film prior to conversion was in the range of 5 to 200 nm. The thickness of the thin-films can vary within these same limits over the surface of the article. Thus, careful control of the thickness of the starting thin-film is not necessary. The oxide layer exhibits a surface characterized by a plurality of randomly positioned discrete protuberances of varying heights and shapes, which protuberances extend from the surface of said substrate a distance of not less than twenty nm, nor more than the wavelength of the radiation absorbed, i.e., 1,500 nanometers, and the bases of which are in substantial contact with the bases of each of adjacent protuberances. The metal oxide layer is overcoated by a thin-film of metal from 40 nanometers to 200 nanometers thick, such that the outer surface of the metal coating substantially conforms to the shape of the structured surface of the oxide layer without completely filling in the valleys and void spaces. When so structured, the article exhibits a total solar absorbance in the range of 70 percent to 98 percent.

A method for generating the absorbing surfaces of the preferred embodiment comprises the steps of forming a microstructured layer on a substrate, which method is disclosed in U.S. Pat. No. 4,252,843 which is hereby incorporated herein by reference, and then depositing a thin layer of metal on the microstructure in such a manner that the deposited material conforms to the structure and closely replicates the underlaying topography in the exterior surface of the deposited material film.

Alternatively, the microstructure of the metal oxide layer may be replicated into the surface of a second element and the replicated microstructured surface overcoated with a thin film of at least one metal from 40 nm to 200 nm thick to produce a radiation absorbing article. If the replicated surface is itself metallic with a microstructure according to the teachings of this invention then it need not be overcoated, although it may be, with a thin-film of the same or a different metal.

"Microstructure" refers to the rough and structured topography resulting from the conversion of a metal thin-film to an oxide or hydroxide layer or replica thereof by a chemical or chemical/electrochemical method. The replication can take place in materials such as plastics which are then overcoated with metals, or the replication may be directly into a metal.

The substrate may be substantially any material. Depending upon the use of the product, the selected substrate could be ceramic, glass, metal, polymeric, fibrous, etc. It is preferred to use polymeric materials as the substrate, and the present invention contemplates the use of both transparent and opaque thermoplastic and thermoset films. Thermoplastic materials, and especially biaxially oriented films, are generally preferred because of their greater ability to resist breaking and cracking. Any organic polymeric material including but not limited to polyesters, polyolefins, polycarbonates, polyvinyl resins, polyvinyl acetals, polyamides, polyurethanes, polyepoxides, polysiloxanes, polyacrylates, polymethacrylates, polystyrene, and the like may be used in the practice of the present invention. The main purpose of these films is to provide a support for the final image, and the film does not itself enter into the imaging characteristics or photosensitive properties of the system itself. The substrate may have a primer or priming treatment on its surface. The support may be as thin or thick as is necessary for support, ranging for example, from 50 micrometers to 2 mm. A preferred range would be from 75 or 100 to 500 micrometers. The backing should provide some contrast with the black microstructured layer.

The photoresist composition may be any photosensitive resist material known in the art. This includes both positive acting and negative acting photoresist systems. Positive acting photoresist systems ordinarily comprise polymeric binders containing positive acting diazonium salts or resins such as those disclosed, for example, in U.S. Pat. Nos. 3,046,120, 3,469,902, and 3,210,239. The positive acting photosensitizers are commercially available and are well reported in the literature. Negative acting photosensitive resist systems ordinarily comprise a polymerizable composition which polymerize in an imagewise fashion when irradiated, such as by exposure by light. These compositions are well reported in the literature and are widely commercially available. These compositions ordinarily comprise ethylenically or polyethylenically unsaturated photopolymerizable materials, although photosensitive epoxy systems are also known in the art. Preferably ethylenically unsaturated photopolymerizable systems are used, such as acrylate, methacrylate, acrylamide and allyl systems. Acrylic and methacrylic polymerizable systems are most preferred according to the practice of the present invention. U.S. Pat. Nos. 3,639,185, 4,008,084, 4,138,262, 4,139,391, 4,158,079, 3,469,982, U.S. Pat. No. 1,468,746, as well as the composition disclosed in U.S. Pat. No. 4,247,616, disclose photosensitive compositions generally useful in the practice of the present invention. U.S. patent application Ser. No. 146,642, filed May 5, 1980, discloses etchant solutions particularly useful in the practice of the present invention.

DETAILED DESCRIPTION OF THE INVENTION

The present invention provides, in a preferred embodiment, an imageable article having a radiation sensitive photoresist layer on a substantially radiation absorbing surface, said article comprising:

a substrate having on at least one surface thereon, a layer of an oxide of a metal selected from the group consisting of aluminum, magnesium, zinc, or alloys thereof, which layer is a substantially complete conversion of a thin-film of the metal, the thickness of the thin-film prior to conversion being at least 5 nanometers and exhibiting a surface after the conversion characterized by a plurality of randomly positioned discrete protuberances of varying heights and shapes, which protuberances extend from the substrate surface a distance of not less than 20 nanometers nor more than the wavelength of the radiation absorbed, i.e., 1,500 nanometers, and the bases of which contact the bases of substantially all adjacent protuberances, an overcoating upon the oxide layer, which overcoating is a contiguous connected thin layer of metal having a thickness in the range of 40 to 200 nanometers, and a photoresist layer over said overcoating.

Figure 1:
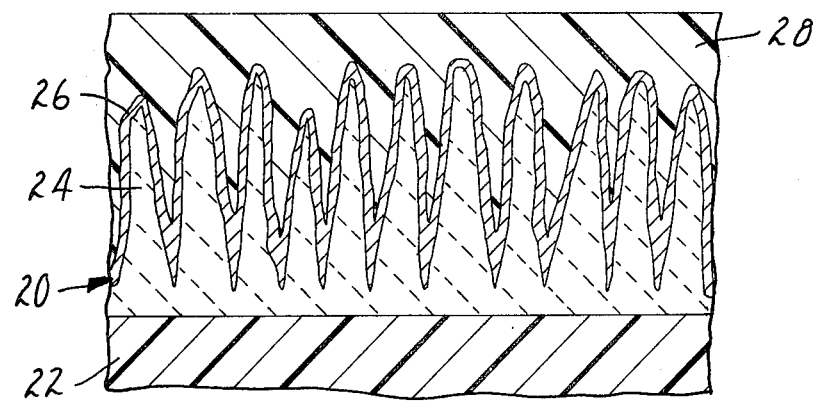
FIG. 1 is an enlarged sectional view of the preferred embodiment of a substrate and radiation absorbing coating of the present invention showing a microstructured oxide layer on a substrate overcoated by a thin-film of metal.

The articles having novel radiation absorbing surfaces and the method for producing such surfaces on a variety of substrates such as aluminum, stainless steel, glass, or polyester, can best be understood by referring more particularly to the drawing. A prior art article comprising a substrate upon which is formed a microstructured oxide layer is disclosed in U.S. Pat. No. 4,190,321, incorporated herein by reference. Referring now to FIG. 1, there is shown the novel radiation absorbing article 20 of the present invention, the article comprising substrate 22 upon which is formed microstructured oxide layer 24 which is overcoated with a thin layer of metal 26. In the process for producing the preferred embodiment of the present invention, article 20 is formed by depositing a thin metal film on the prior art embodiment such that the metal coating conforms to the shape of the structured surface of the substrate without filling in the valleys and void spaces. Article 20 is an excellent radiation absorber. Before it is overcoated, microstructured oxide layer 24 exhibits a surface morphology which can generally be described as being a plurality of randomly positioned discrete protuberances of varying heights and shapes, the base of each protuberance being in substantial contact with the base of adjacent protuberances. The protuberances extend from the substrate surface a distance of not less than 20 nanometers, and preferably extend from the substrate surface a distance varying from that corresponding to the wavelength of the radiation absorbed down to 1/10 that wavelength, i.e., approximately 1500 down to 40 nanometers. The photoresist (28) is also shown (e.g., generally 1 to 50 micrometers, preferably 3 to 30 micrometers).

Figure 2:
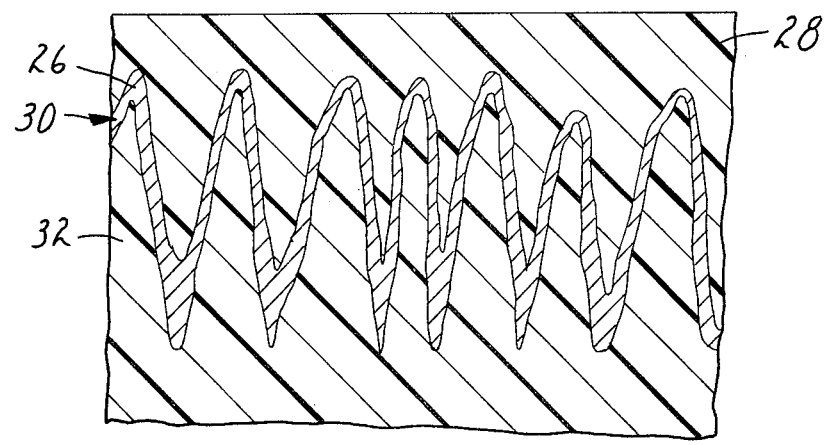
FIG. 2 is an enlarged sectional view of an imageable system of the present invention depicting a substantially radiation absorbing composite structure comprising a replicated microstructured surface overcoated by a thin-film of metal and finally overcoated with a photoresist layer.

FIG. 2 shows a radiation sensitive imageable article 30 of the present invention wherein the microstructure of the above-mentioned metal oxide layer has been replicated into the surface of a second element 32, which may be any material, metal or nonmetal, preferably polymeric resins (e.g., thermoplastic or thermoset resins). The replicated microstructured surface is then overcoated by a thin-film of metal 26 to produce a substantially radiation absorbing surface. This need not be done if the surface is already metal. The thin-film of metal 26 is then coated with a photoresist layer 28 to produce the imageable article of the present invention.

Thin film 26 covering microstructures 24 and 32 can be selected from any metal and preferably a variety of suitably stable metals; preferably it is chromium, aluminum, copper, gold, or nickel; and most preferably it is chromium. Metal alloys may also be used. Thin film 26 can be deposited by vacuum vapor deposition, sputtering, electroless plating, chemical vapor deposition, or other suitable methods. A single film or a set of films using different materials may be used. All metals give selectively absorptive surfaces, although some are better than others depending on individual metal emissivity. The choice of the material for the substrate helps determine the amount of absorbed energy which will be reradiated. Suitable substrate materials to produce low radiation emitters are metals such as stainless steel, aluminum, chromium, copper, and nickel. Materials which are high thermal radiators are dielectrics such as glass and ceramics. Thin layer 26 should have a thickness in the range of 40 to 200 nanometers, preferably 40 to 160 nm and most preferably 50 to 80 nm.

Objects and advantages of this invention are further illustrated by the following examples, but the particular materials and amounts thereof recited in these examples, as well as the conditions and details, should not be construed to unduly limit this invention.

EXAMPLE 1

A glass slide was cleaned and then a portion was vapor coated with 30 nm of aluminum on one side. The aluminum film was then subjected to saturated steam at a temperature of about 95° C. for approximately three minutes, during which time the film was completely converted to a microstructured layer of boehmite, AlO(OH), approximately 120 nm thick. The slide was subsequently rinsed, dried and then the coated side was overcoated with a coating about 160 nm thick of vapor deposited chromium. The area on the glass slide where the chromium was deposited over the structured layer of boehmite was black and non-reflective and was a very good absorber. The area where the chromium was deposited directly on glass was shiny and highly reflective and was a very poor absorber.

EXAMPLE 2

A 200 micron thick clean foil of #3003 aluminum alloy (available from Alcoa) was exposed to saturated steam as in Example 1 for about 2 or 3 minutes to generate a layer of boehmite and then was overcoated on one major surface by vacuum vapor deposition of a coating of approximately 51 nm thick of chromium. The surface appeared black and was shown to be non-reflecting and a good absorber. The emissivity, E, was measured and found to be 0.19 which demonstrated that it was a poor emitter and thus did not reradiate the absorbed energy.

EXAMPLE 3

A radiation absorbing surface was prepared as in Example 2 with the exception that the chromium layer was about 87.5 nm thick. The surface again appeared black and was shown to be non-reflecting. The measured emissivity was 0.38 which demonstrated again that most of the absorbed energy was not reradiated.

EXAMPLE 4

One surface of a polyester film was vacuum vapor coated with a layer of aluminum approximately 50 nm thick and subsequently converted to boehmite by exposure to steam as in Example 1. A 125 micron thick film of low density polyethylene was then placed on the microstructured surface and subsequently laminated between two plattens heated to 125° C. and pressed together at a pressure of about 141 kg/cm$^2$ for two minutes. After cooling, the embossed polyethylene film was peeled from the boehmite surface and then overcoated on the embossed side with 52 nm of chromium. The surface appeared very black and was a good absorber where the boehmite microstructure had been embossed into the polyethylene and bright, shiny metallic and a poor radiation absorber where the polyethylene was smooth.

EXAMPLE 5

An imageable article according to the present invention was prepared from a radiation absorbing element produced according to the method of Example 1 on $7.62 \times 10^{-4}$ m polyester with a 1500Å coating of aluminum and then overcoated with 500Å coating of chromium. This element was coated with a wire wound rod at approximately 12 micrometers (wet thickness) with a coating composition comprising 0.20 grams of a 20% by weight solution of Compound A of U.S. Pat. No. 4,249,011,
0.44 grams of a 20% by weight solution of an 80/20 copolymer of n-butylacrylate and methyl acrylic acid,
0.02 grams of a 20% by weight solution of an 86/14 copolymer of vinyl acetate/vinyl chloride,
0.008 grams Michlers ketone, and
0.080 grams of diphenyliodonium hexafluorophosphate.

The solvent was acetone and additional solvent, to 3 grams total solution, was added to the composition. The film was dried at 82° C. for 4 minutes then exposed for two seconds at a distance of one meter through a 0-10 step wedge to a 2 KW diazo lamp (Berkey Ascor Printer) at low intensity for two (2.0) seconds with 0.30 density units per step as the target. The imaged film was developed by a 30 second water wash and 15 second scrub with a printing plate scrub pad. A photopolymerized image of the step wedge showing 4 solid steps over a black layer was produced.

EXAMPLE 6

Example 5 was repeated except that a thin-film layer of 500Å of aluminum was overcoated instead of the chromium. It was coated and dried in the same manner, but after it was developed with tapwater, it was etched with a 0.10 M NaOH etch bath at 20° C. for 15 minutes. An image of the step wedge was produced with a $D_{max}$ of 2.35 with 8 solid steps apparent. The top side of the film (photopolymer side) appeared black, the bottom side appeared shiny.

EXAMPLE 7

The radiation absorbing element of Example 6 was duplicated except that a 1500Å overcoat of aluminum was vapor deposited. This element was overcoated with a negative acting photoresist composition comprising 0.82 grams of a 30% by weight solution in acetone of Compound A of U.S. Pat. No. 4,249,011,
0.60 grams of an 18.4% by weight solution in acetone of an 80/20 copolymer of n-butylacrylate/methyl acrylic acid,
0.52 grams of a 2% by weight solution in acetone of an 86/14 copolymer of vinyl acetate/vinyl chloride,
0.008 grams Michler's ketone,
0.008 grams diphenyliodonium hexafluorophosphate, and acetone to 3 grams of solution.

Coating and drying conditions were the same as in Example 5. Exposure and processing (development and etching) were the same as in Example 6. A visible black image having a $D_{max}$ of 2.80 showing 5 solid steps was produced. The image of the Stauffer wedge scale was black on one side and shiny on the back side. Some minor separation of the aluminum from the substrate under the coating was noted. The use of a priming layer (in this case polyvinylidene chloride) was found to prevent this separation of the metal when the example was repeated. A somewhat greater optical density (i.e., 3.04) and six solid steps were provided with the primed film.

EXAMPLE 8

A microstructured surface was prepared by sputter etching the surface of a $7.02 \times 10^{-4}$ m polyester film. This surface was found to have physical characteristics within the defined limits for microstructured surfaces according to the practice of the present invention. That surface was provided with a 1000Å coating of vapor deposited aluminum. The surface appeared black when viewed from the top side, and shiny from the back side. This radiation absorbing element was coated as in Example 5 with a negative acting photoresist composition comprising 0.40 grams of a 30% by weight solution in 1,1,2-trichloroethane of Compound A of U.S. Pat. No. 4,249,011,
0.079 grams of a 20% by weight solution in 1,1,2-trichloroethane of a diallylorthophthalate prepolymer,
0.19 grams of a 2% by weight solution in 1,1,2-trichloroethane of an 85/15 copolymer of n-butylmethacrylate and methyl methacrylic acid,
0.16 grams of a 20% by weight solution in 1,1,2-trichloroethane of an 86/14 copolymer of vinyl acetate/vinyl chloride,
0.008 grams of Michler's ketone,
0.016 grams diphenyliodonium hexaflurophosphate, and
1,1,2-trichloroethane to 3 grams of solution. The coated radiation absorbing surface was dried at 88° C. for four-and-one-half minutes. Exposure was identical to that of Example 5. The imaged film was developed by immersion in a bath of 0.30 M sodium hydroxide and 0.10 M sodium carbonate for 4 minutes at 30° C. the rubbing with a printing plate development pad. An image having a maximum optical density (transmissive) of 1.98 and 4 solid steps was provided. The image was black on the photopolymer side and shiny on the back side.

This Example when repeated on the microstructured surface provided according to Example 4 showed substantially identical results.

We claim:

1. An imageable article comprising a photoresist layer coated on a substantially radiation absorbing layer of metal on a microstructured layer, both the metal layer and microstructured layer having a microstructured surface characterized by a plurality of randomly positioned discrete protuberances of varying heights and shapes, which protuberances have a height of not less than 20 nanometers nor more than 1500 nm, the average spacing between the tips of the protuberances being no more than twice the average height of the protuberances, and the bases of which contact the bases of substantially all adjacent protuberances wherein the metal is selected from chromium, aluminum, copper, gold and nickel.

2. The article according to claim 1 wherein said protuberances extend from said layer of metal a distance of not more than 800 nm and the average spacing between tips of the protuberances is no more than twice the average height of the protuberances.

3. The article of claim 1 wherein said substantially radiation absorbing surface comprises a composite surface of:
   (a) a replicated microstructured layer characterized by a plurality of randomly positioned discrete protuberances of varying heights and shapes, the average spacing between tips of the protuberances being no more than twice the average height of the protuberances, which protuberances have a height of not less than 20 nanometers nor more than 1500 nm, and the bases of which contact the bases of substantially all adjacent protuberances, and
   (b) an overcoating of a thin film of at least one metal having a thickness in the range of 40 to 200 nanometers conforming to the shape of the surface of the microstructured layer without filling in valleys between the protuberances.

4. The article of claim 3 wherein said composite surface is a selective absorbing surface.

5. The article of claim 3 wherein said replicated microstructured layer is an embossable material selected from metal, nonmetal and organic polymeric materials.

6. The article of claim 1 wherein the average spacing between the tips of the protuberances is no more than one-half the average height of the protuberances.

7. The article of claim 1 wherein the average spacing between the tips of the protuberances is in the range of from one-tenth to one-fourth the average height of the protuberances.

8. The article of claim 1 wherein said substantially radiation absorbing surface comprises a substrate having on at least one surface thereof,
   (a) a layer of an oxide of a metal, selected from the group consisting of aluminum, magnesium and zinc or alloys thereof, which layer is a substantially complete conversion to an oxide or oxide-hydroxide of a thin-film of said metal, the thickness of said thin-film prior to conversion being at least 5 nanometers and exhibiting a surface after said conversion characterized by a plurality of randomly positioned discrete protuberances of varying heights and shapes, which protuberances extend from said substrate surface a distance of not less than 20 nanometers nor more than 1500 nm, and the bases of which contact the bases of substantially all adjacent protuberances, and
   (b) an overcoating upon said oxide layer, which overcoating is a contiguous connected thin layer of at least one metal having a thickness in the range of 40 to 200 nanometers.

9. The article according to claim 8 wherein said substrate is selected from aluminum, stainless steel, glass and polyester.

10. The article according to claim 8 wherein said metal overcoating is selected from chromium, aluminum, copper, gold and nickel.

11. The article of claims 1, 2, 3 or 8 wherein said photoresist layer is a negative acting photosensitive layer comprising polymerizable materials having ethylenically unsaturated groups.

12. The article of claims 1, 2, 3 or 8 wherein said photoresist layer is a positive acting photosensitizer layer comprising positive acting diazo oxides in a polymeric binder.

13. The article of claims 1, 2, 3 or 8 wherein said photoresist layer is a negative acting photosensitive layer comprising materials having (1) polymerizable acryloyl groups, methacryloyl groups, or both acryloyl and methacryloyl groups and (2) free radical photoinitiators.

* * * * *